3,696,064
STABLE PHENOLIC ADHESIVE MIX
Jerry Peter Re, Eugene, Oreg., assignor to
Borden, Inc., New York, N.Y.
No Drawing. Filed Nov. 9, 1970, Ser. No. 88,126
Int. Cl. C08g 51/14
U.S. Cl. 260—17.2         11 Claims

ABSTRACT OF THE DISCLOSURE

In the art of preparing phenolic adhesive mixes by mixing a phenolic resin with conventional adhesive addities which include an extender and an amylaceous material, the improvement comprising heating said mix to a temperature in the range of 30–105° C. for a period of time sufficient to solubilize said amylaceous material for the purpose of improving stability of the adhesive mix.

---

This invention relates to stabilizing phenolic adhesive mixes by incorporating finely divided amylaceous material in the adhesive mix and heating the mix to a temperature in the range of 30–105° C. until the amylaceous material gelatinizes.

The average molecular weight of a phenolic resin determines its melting point or viscosity, and thus its handling and processing properties. Low molecular weight resins are liquid while high molecular weight resins are brittle, grindable solids. In reference to the low molecular weight resins, the molecular weight may range from mixtures of monomeric phenol alcohols in 125–150 range up to solid, grindable, one-step resins of over 1000. The phenolic resins adapted for adhesive use are preferably one-step, alkaline-catalyzed resins, known as resoles, wherein the phenol to formaldehyde ratio is at least 1/1 and the pH of the reaction mixture is in the range of 7–12. Although, from 1–3 moles of formaldehyde per 1 mole of phenol can be used, it is preferred to use from 1.1 to 1.2 moles of formaldehyde for each mole of phenol. The ratio of at least one mole of formaldehyde per mole of phenol assures that the catalyzed mixture of phenol and formaldehyde will become thermosetting upon completion of the polymerization reaction. If the reaction mixture contains less than 1 mole of formaldehyde per mole of phenol, the result will be a thermoplastic product not a thermosetting product, since the mixture will not be capable of attaining sufficient cross-linking. Should phenol be allowed to evaporate or boil away so that the ratio is more than one mole of formaldehyde per mole of phenol, a thermosetting product can result. The product of an alkaline-catalyzed mixture containing less than 1 mole of formaldehyde per mole of phenol is a solution of one-step resin in phenol. Upon heating the reaction mixture without loss of any phenol, the product can be converted to a novolac. Novolac is commercially important in the manufacture of high-ortho-content resins at a pH range of 4–7.

For purposes of this disclosure, a suitable phenolic resin for adhesive applications is any liquid resin prepared by reacting phenol and formaldehyde, or their equivalents, which resin can be cured to a thermosetting state. Especially preferred resins are the phenol-formaldehyde resoles.

In preparing phenolic resins suitable for use in adhesive mixes, pure phenol at 60–65° C. and an aqueous formaldehyde solution at about 40° C. are charged to a vessel together with from 2% to 6%, based on phenol, of an alkaline catalyst. Aqueous formaldehyde solution is preferably 37–40% formaldehyde. Agitation of the mixture is started and steam is introduced to raise the temperature to about 60–70° C. until exothermic reaction becomes strong enough to supply sufficient heat.

When the temperature of the reaction mixture reaches 60–70° C., the exothermic reaction has been initiated and the steam is turned off. It is common to reflux at a low vacuum for a period of 1–3 hours at a temperature of 80–100° C. Dehydration is accomplished at a temperature up to 100° C. and under a vacuum. In order to determine when to terminate the reaction, samples are taken periodically when temperature reaches 90–95° C. and progress of shorter and shorter gel time is followed until the desired range is reached. This may be in the range of 60–90 seconds at 150° C. The reaction must be terminated, as by means of cooling, before the resin solidifies, since the resin should be liquid for adhesive applications. The liquid phenolic resin, prepared as described above, will have the following properties:

| | |
|---|---|
| Color | Reddish-brown. |
| Specific gravity | 1.14–1.30. |
| pH | 7–12. |
| Viscosity, centipoises | 35–5000. |
| Water tolerance | Nil to infinite. |
| Nonvolatiles, percent | 30–55%. |

Other substances can be used in place of phenol, as for example ortho-, meta-, para-cresols; xylenols; trimethyl phenols; resorcinol; 1,3-benzenediol; paraphenylphenol; etc. Resorcinol resins set at room temperature and have advantages of waterproofness and durability. The following substances can be used in place of formaldehyde: paraformaldehyde, furfural, acetaldehyde, butyraldehyde, etc. The alkaline catalyst is used in amount of from 1–12%, based on weight of phenol charged, and preferably from 2–6%. Although sodium hydroxide is preferred, other alkaline catalysts include sodium carbonate, potassium carbonate, potassium hydroxide, barium hydroxide, quaternary ammonium compounds, ammonia, and primary and secondary amines.

Curable phenolic resins have many applications such as molding materials, coatings, and bonding resins for use in the production of various laminates, such as plywood.

In most of the applications noted above, it is desirable to work with aqueous solutions of the resin and in particular, with concentrated solutions which yield between 40%–60% solids on evaporation to dryness. Phenol and formaldehyde, or other equivalents, condense conveniently in aqueous solution at the desired solids level but commercial exploitation of such aqueous solutions suffers a drawback in that the physical stability of these solutions is quite poor. For example, at 40° F., a liquid resin will have a storage period of about 18 months, while the same resin will not last more than about 60 days at 90° F. This invention does not pertain to improving stability of resins; this invention pertains to improving stability of phenolic adhesive mixes.

In the manufacture of polywood, it is a common practice to prepare an adhesive mix of phenol and formaldehyde in an aqueous alkaline solution and add thereto, just prior to use in the plywood plant, lignocellulosic filler, amylaceous or proteinaceous material, alkaline chemicals and water. Such adhesive mixtures have a tendency to separate if allowed to stand without agitation for a period of a couple of hours to several days. Since the use of phenolic adhesive mixes in plywood manufacture requires that the mix be agitated every couple of hours or used promptly in order to maintain the adhesive additives in suspension, it would be desirable to prepare a more stable adhesive mix in order to avoid the necessity of mixing and the concomitant costs.

It is, therefore, an object of this invention to prepare an adhesive mix which would be stable for a longer period of time. It is another object of this invention to prepare an adhesive mix by mixing powdered amylaceous material with a phenolic resin, heating the mix to a temperature in the range of 30–105° C. for a period of time sufficient to solubilize the amylaceous material and admixing a lignocellulosic extender together with other conventional adhesive additives.

These and other objects will become apparent from the disclosure which follows.

This invention pertains not to the stabilization of the phenolic resins but to stabilization of phenolic adhesive mixes which may contain, in addition to the phenolic resin, such additives as lignocellulosic extenders and powdered amylaceous material. A phenolic adhesive mix prepared in accordance with a prior art process is stable for 2–3 days, following which, settling out of the ingredients commences. When phenolic adhesive mix is prepared by a process outlined below, stability is prolonged for a period of time ranging from 10 to 15 days.

The novel process involves mixing phenolic resin and amylaceous material and then heating the mixture at a temperature of 30–105° C., preferably 45–85° C., for a period of time from 1 to 420 minutes, and preferably from 2 to 10 minutes, until the amylaceous material solubilizes. At this point, other ingredients can be added such as lignocellulosic extender, pigment and other conventional adhesive additives. Based on the weight of the total adhesive mix, amount of phenolic resin such as phenol-formaldehyde resin solids may vary from 12% to 60%; alkaline catalyst such as caustic soda, from 5% to 25%; powdered amylaceous material, from 2% to 20%; and lignocellulosic extender, from 0% to 12%. On preferred basis, the phenolic adhesive mix will contain 25–40% phenolic resin; 5–10% alkaline catalyst; 4–12% amylaceous material; and 0–4% lignocellulosic extender. Solids content of the adhesive mix will vary from 30–70%, preferably 35–60%, and its viscosity will be in the range of 500–20,000 cp., and preferably from 1000–5000 cp., measured at 21° C.

Suitable phenolic resin is any phenolic resin which is prepared under alkaline catalysis conditions and which can be cured to a thermosetting stage. Preferred resins are the resoles or the one-step phenol-aldehyde resins. Amylaceous material is defined as being of the nature of starch or starchy, and includes wheat flour, wheat starch, potato starch, corn starch, and tapioca. Addition of amylaceous material to phenolic adhesive mixes is made for the purpose of facilitating curing of the adhesive mix, reduction of press time and other advantages known in the art. Lignocellulose is defined as any of the compounds of lignin and cellulose comprising the essential part of woody cell walls. Lignocellulosic extenders, therefore, include such finely divided materials as wood flour, residue from corn cobs, ground walnut shells, filbert shell flour, ground bark such as fir or alder, sander dust flour and particle board.

The amylaceous material can be added at any time during the preparation of the phenolic resin, but it is preferred to add it when cooling of the final resin is commenced. At any of these stages, the resin is above a temperature of 30° C. and there is sufficient heat to solubilize the amylaceous material.

In applications which do not require the presence of lignocellulosic extenders, adding amylaceous material to phenolic resin and heating the mix at 30–105° C. for a sufficient period of time to solubilize the amylaceous material, will result in a phenolic adhesive mix which is exceedingly stable, i.e., which is stable for a period in excess of six months at 70° F.

In the production of plywood, the adhesive mix is roller-coated on wood veneers which are cross-grain stacked and pressed between a pair of hot platens. Curing of the adhesive mix may be accomplished in a 5-minute cycle at a temperature of 270–400° F. and a pressure of 150–250 p.s.i. Curing of the adhesive mix can also be carried out at room temperature by substituting resorcinol for phenol. The phenolic mixes used as adhesives also include fillers and extenders, which are merely present in the form of mechanically mixed components. Examples of such fillers and extenders are: walnut shell flour, titanium dioxide, birch flour, fir flour, particle board, sand dust, ground corncob residue from fufural production, alder bark flour, fir bark flour, and asbestos flour.

The following examples are presented for the purpose of illustrating the herein-described invention.

EXAMPLE I

This example illustrates addition of the amylaceous material during preparation of phenol-formaldehyde resin.

8,830 lbs. of 87% aqueous solution of phenol and 10,060 lbs. of 50% aqueous solution of formaldehyde were pre-mixed and 1,940 lbs. of 50% aqueous solution of sodium hydroxide solution was added slowly in order to control the exotherm. This control can also be achieved by cooling coils disposed in the reaction mixture or by cold water refluxing and vacuum. The condensation reaction was conducted at 60–100° C. When the mixture became viscous, 8,620 lbs. of water and 1,115 lbs. of 50% aqueous solution of sodium hydroxide were added with agitation which temporarily reduced viscosity of the mixture. With time, viscosity of the mixture rose, and again, 558 lbs. of water and 727 lbs. of 50% aqueous solution of sodium hydroxide were added. When viscosity of the mixture rose again, 2,464 lbs. of water and 1,232 lbs. of powdered amylaceous material, wheat flour, was added with agitation. After 2 minutes, amylaceous material solubilized and the mixture became clear and viscous to the point where the final addition was made of 528 lbs. of water, 1,760 lbs. of aqueous solution of sodium hydroxide, 1,960 lbs. of lignocellulosic extender, finely ground corn cob residue, and 39 lbs. of lampblack. Lampblack was added for darkening the adhesive mixture so that a better visual coverage would be obtained. After allowing the reaction to proceed until a viscosity of 1,000 cps. measured at 210° C. was reached, the reaction was terminated and a final adhesive mix of 38,833 lbs., 36% solids, was recovered. This adhesive mix was kept at room temperature and remained stable, i.e., without visible precipitation, for 15 days.

EXAMPLE II

This example illustrates superior stability of an adhesive mix which was prepared in absence of the lignocellulosic extender.

Here again, 8,830 lbs. of 87% aqueous solution of phenol were pre-mixed with 10,060 lbs. of 50% aqueous solution of formaldehyde and 1,940 lbs. of a 50% aqueous solution of sodium hydroxide were added slowly with agitation. When the mixture became viscous, 7,620 lbs. of water and 1,115 lbs. of 50% caustic were added, which was followed by addition of 558 lbs. of water and 727 lbs. of 50% caustic, as in Example I. When viscosity increased again, 2,464 lbs. of water and 1,234 lbs. of powdered amylaceous material, wheat flour, were added with agitation. The reaction was continued until the amylaceous material solubilized. 34,546 lbs. of a 40% solids concentration adhesive mix was obtained which had a viscosity of 1,000 cps. at 21° C. This adhesive mix was stable for over six months at room temperature.

EXAMPLE III

This example illustrates addition of amylaceous material to a ready-made resin.

To 30,850 lbs. of phenol-formaldehyde resin of 40% solids, were added 2,464 lbs. of water and 1,232 lbs. of wheat flour with stirring. The mixture was heated to a temperature of 70° C. and held there until the mixture cleared-up, indicating that the amylaceous material went into solution. At this point, 528 lbs. of water and 1,760 lbs. of 50% caustic were added and the mixture agitated until viscosity of the mixture rose when 1,960 lbs. of finely ground corn cob residue and 39 lbs. of lampblack were admixed. The resulting adhesive had a solids concentration of 40% and viscosity of 1,000 cps. at 21° C. It remained stable for 12 days.

EXAMPLE IV

In this example, 1,232 lbs. of wheat flour was added with agitation to 30,850 lbs. of phenolic resin, prepared as in Examples I and II. This mixture was heated to a temperature of about 65° C. and maintained at elevated temperature until the wheat flour solubilized, at which time the adhesive mix was cooled. The mix had a solids concentration of about 40% and a viscosity of about 1,000 cps. measured at 21° C. It remained stable for 15 days.

I claim:

1. In the art of preparing a phenolic adhesive mix where a phenolic resin is formed by reacting a phenol and aldehyde in presence of an alkaline catalyst and where said phenolic resin is mixed with conventional adhesive additives including a finely divided conventional extender and an amylaceous material, the improvement comprising heating said adhesive mix to a temperature in the range of 30 to 105° C. until said amylaceous material is solubilized for the purpose of extending stability of said adhesive mix.

2. Process of claim 1 wherein said extender is lignocellulosic, said amylaceous material is finely divided and is selected from the group consisting of wheat flour, wheat starch, potato starch, corn starch and tapioca.

3. Process of claim 2 wherein said adhesive mix is heated for a period of from 1 to 420 minutes.

4. Process of claim 3 wherein said adhesive mix is heated for a period from 2 to 10 minutes.

5. Process of claim 2 wherein amount of said amylaceous material is in the range of 2–20% by weight, based on the weight of said adhesive mix.

6. Process of claim 5 wherein said resulting adhesive mix has a viscosity in the range of 500–20,000 as measured at 21° C.

7. Process of claim 5 wherein said resulting adhesive mix has a solids concentration in the range of 30–70%.

8. Process of claim 7 wherein said phenol is phenol and said aldehyde is formaldehyde.

9. Process of claim 8 wherein said lignocellulosic extender is selected from the group consisting of corn cob residue, walnut shell flour, filbert shell flour, wood flour, particle board, sander dust flour, fir bark flour and alder bark flour, amount of said extender being in the range of 0–12% by weight, based on the weight of said adhesive mix.

10. Process of claim 1 which includes the steps of incorporating said amylaceous material in said phenolic resin whereby said amylaceous material is solubilized therein and then, admixing said lignocellulosic extender and other conventional adhesive additives.

11. Process of claim 10 wherein said aldehyde is an aqueous solution of formaldehyde and wherein the resulting adhesive mix has a slurry consistency.

References Cited

UNITED STATES PATENTS 3,282,869  11/1966  Bryner _____ 260—17.2

WILLIAM H. SHORT, Primary Examiner

E. WOODBERRY, Assistant Examiner